US010820052B2

(12) United States Patent
O'Callaghan

(10) Patent No.: US 10,820,052 B2
(45) Date of Patent: Oct. 27, 2020

(54) DISPLAYING TIME-BASED CONTENT AND THIRD-PARTY ON-DEMAND CONTENT IN A GRID-BASED PROGRAMMING GUIDE

(71) Applicant: Verizon Patent and Licensing Inc., Arlington, VA (US)

(72) Inventor: Daniel J. O'Callaghan, Fairfax Station, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 11 days.

(21) Appl. No.: 16/161,537

(22) Filed: Oct. 16, 2018

(65) Prior Publication Data

US 2020/0120393 A1 Apr. 16, 2020

(51) Int. Cl.

| | |
|---|---|
| ***H04N 21/472*** | (2011.01) |
| ***H04N 21/482*** | (2011.01) |
| ***H04N 21/45*** | (2011.01) |
| ***H04N 21/442*** | (2011.01) |
| ***H04N 21/475*** | (2011.01) |
| ***H04N 21/858*** | (2011.01) |

(52) U.S. Cl.

CPC . *H04N 21/47202* (2013.01); *H04N 21/44222* (2013.01); *H04N 21/4532* (2013.01); *H04N 21/4756* (2013.01); *H04N 21/4821* (2013.01); *H04N 21/858* (2013.01)

(58) Field of Classification Search

CPC ....... H04N 21/47202; H04N 21/44222; H04N 21/4532; H04N 21/4756; H04N 21/4821; H04N 21/858

See application file for complete search history.

(56) References Cited

U.S. PATENT DOCUMENTS

| | | | | |
|---|---|---|---|---|
| 2004/0205816 A1* | 10/2004 | Barrett | H04N 5/76 | 725/49 |
| 2004/0226042 A1* | 11/2004 | Ellis | H04N 5/44543 | 725/43 |
| 2006/0107304 A1* | 5/2006 | Cleron | H04N 5/44543 | 725/135 |
| 2015/0189388 A1* | 7/2015 | Devassykutty | H04N 21/47202 | 725/44 |
| 2016/0227279 A1* | 8/2016 | Fang | H04N 21/4532 | |
| 2017/0155946 A1* | 6/2017 | Coenen | H04N 21/42224 | |

* cited by examiner

*Primary Examiner* — Nasser M Goodarzi
*Assistant Examiner* — Adil Ocak

(57) ABSTRACT

A device can provide a first instruction to display a grid-based programming guide in a graphical user interface (GUI). The grid-based programming guide can include a plurality of time-scheduled content providers and a plurality of time-scheduled content elements, and a plurality of on-demand content providers and a plurality of on-demand content elements. The device can receive an input associated with a first on-demand content provider, can establish, based on receiving the input, a session with a content platform associated with the first on-demand content provider, and can provide, based on establishing the session with the content provider, a second instruction to display the content in the GUI via the session with the content provider.

20 Claims, 16 Drawing Sheets

500

510

Provide a first instruction to display a grid-based programming guide in a graphical user interface (GUI), wherein the grid-based programming guide includes a display of a plurality of content providers along a first axis of the grid-based programming guide, wherein the grid-based programming guide includes a display of a plurality content elements, associated with the plurality of content providers, along a second axis of the grid-based programming guide, wherein the grid-based programming guide includes a first grid including a plurality of time-scheduled content providers, of the plurality of content providers, and a plurality of time-scheduled content elements, of the plurality of content elements, associated with the plurality of time-scheduled content providers, and wherein the grid-based programming guide includes a second grid, separate from the first grid, including a plurality of on-demand content providers, of the plurality of content providers, and a plurality of on-demand content elements, of the plurality of content elements, associated with the plurality of on-demand content providers

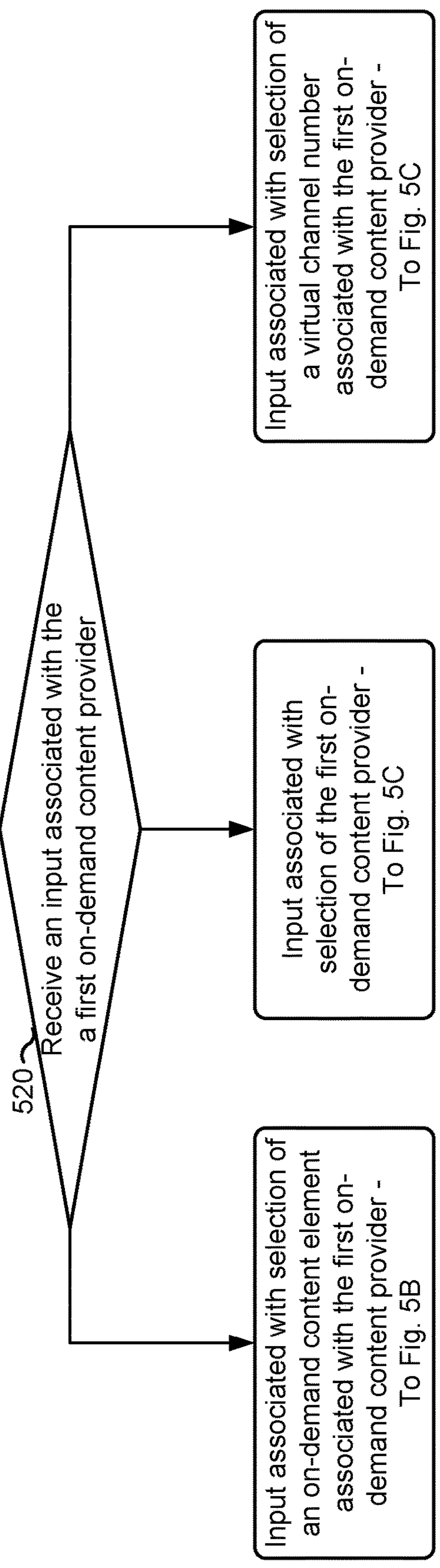

FIG. 5A

DISPLAYING TIME-BASED CONTENT AND THIRD-PARTY ON-DEMAND CONTENT IN A GRID-BASED PROGRAMMING GUIDE

BACKGROUND

Video-on-demand can be a technique of providing content, which allows a user to view and/or listen to the content whenever the user chooses rather than at a scheduled time. The content can be streamed to various devices (e.g., a set-top box, a computer, and/or the like), which allows the content to be viewed in real time, downloaded to another device, and/or the like.

BRIEF DESCRIPTION OF THE DRAWINGS

FIGS. 5A-5C are flow charts of example process for displaying time-based content and on-demand content in a grid-based programming guide.

DETAILED DESCRIPTION OF PREFERRED EMBODIMENTS

Figure 1A:
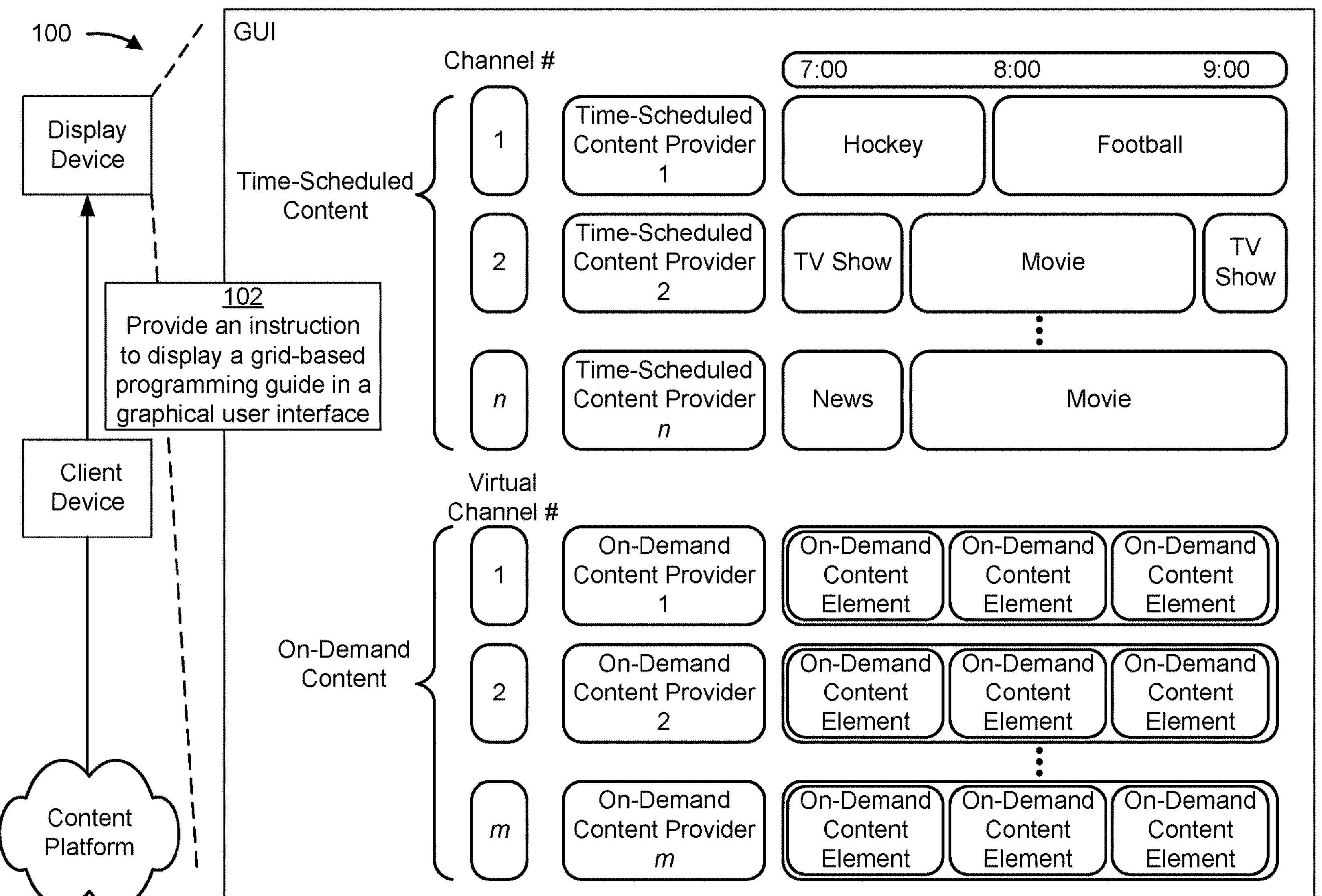
FIGS. 1A-1J are diagrams of an example implementation described herein.

The following detailed description of example implementations refers to the accompanying drawings. The same reference numbers in different drawings can identify the same or similar elements.

In some cases, a user can use a device to access content from a plurality of content providers that provide time-scheduled content, on-demand content, and/or the like. The user can access the content via a programming guide displayed in a graphical user interface (GUI) on a display device. However, some devices may not be capable of displaying a GUI that allows the user to view and/or access both time-scheduled content and on-demand content from a plurality of different content providers in a single grid-based programming guide.

Some implementations described herein provide a device that is capable of generating a GUI that can display a grid-based programming guide. The grid-based programming guide can include a display of a plurality of content providers along a first axis of the grid-based programming guide, and a display of a plurality of content elements, associated with the plurality of content providers, along a second axis of the grid-based programming guide. The grid-based programming guide can include a first grid including a plurality of time-scheduled content elements, of the plurality of content elements, associated with the plurality of time-scheduled content providers, and a second grid, separate from the first grid, including a plurality of on-demand content providers, of the plurality of content providers, and a plurality of on-demand content elements, of the plurality of content elements, associated with the plurality of on-demand content providers.

In some implementations, the device can receive an input associated with a first on-demand content provider; can establish, based on receiving the input, a session with a content platform, associated with the first on-demand content provider; and can provide, based on establishing the session with the content platform, a second instruction to display the content in the GUI via the session with the content platform.

In this way, the device can generate a display of a grid-based programming guide, in which a grid of time-based content elements is displayed along with a grid of on-demand content elements from a plurality of different content providers in the same GUI, which conserves computing resources of the device, memory resources of the device, battery consumption of the device, and/or the like, that would otherwise be used to display and/or switch between displaying different programming guides. Moreover, this improves the user experience of the GUI by reducing the quantity of interactions with the GUI that are needed to locate a particular content element.

FIGS. 1A-1J are diagrams of an example implementation 100 described herein. As shown in FIGS. 1A-1J, implementation 100 can include various devices, such as a content platform, a client device, a display device, and/or the like. In some implementations, the content platform can store various types of content, such as on-demand content (e.g., content that can be viewed and/or downloaded at any particular time, such as on-demand movies, on-demand television shows, and/or the like), web-based content associated (e.g., a web page associated with a particular on-demand content element, a home page associated with the on-demand content provider, and/or the like), and/or the like. In some implementations, the content platform can be associated with a particular on-demand content provider (e.g., a content provider that generates, is associated with, and/or provides, on-demand content). In some implementations, implementation 100 can include a plurality of content platforms, where each content platform, of the plurality of content platforms, can be associated with a particular content provider.

In some implementations, the content platform can send data to and/or receive data from the client device. In some implementations, the client device can be a device capable of generating a GUI for display on the display device, capable of receiving an input associated with the GUI, capable of sending data to and/or receiving data from the content platform, and/or the like. For example, the device can include a mobile phone, a desktop computer, a laptop, a server device, a tablet computer, a set-top box, a media streaming device, a smart device (e.g., a smart television, a smartphone, a smartwatch, and/or the like), and/or the like.

In some implementations, the display device can include a device, such as a touch screen display, a monitor, a television, and/or the like, that is capable of displaying the GUI generated by the client device. For example, the display device can receive the GUI generated by the device, along with an instruction to display the GUI, and the display device can display the GUI based on receiving the GUI and the instruction. The display device can be included as part of the client device, can be a separate device and communicatively connected with the client device, and/or the like.

As shown in FIG. 1A, and by reference number 102, the client device can provide, to the display device, an instruction to display a grid-based programming guide in a GUI. The grid-based programming guide can include a display of a plurality of content providers (e.g., time-scheduled content providers 1 through n, collectively referred to as "time-scheduled content providers"; on-demand content providers 1 through m, collectively referred to as "on-demand content providers"; and/or the like) along a first axis of the grid-based programming guide (e.g., a vertical axis as shown in FIG. 1A, a horizontal axis, and/or the like), can include a display of a plurality of content elements along a second axis of the grid-based programming guide (e.g., a horizontal axis as shown in FIG. 1A, a vertical axis, and/or the like), and/or the like.

A content provider can be any service provider that provides content (e.g., a cable television network, a satellite television network, an over-the-top media services provider, an on-demand content provider, and/or the like). Content, from the content provider, can be displayed with additional elements associated with the content provider, such as a channel number associated with the content provider, a virtual channel number associated with the content provider, a name associated with the content provider, a logo associated with the content provider, and/or the like. A content element can be associated with content associated with a particular content provider, such as a video (e.g., television shows, movies, and/or the like), audio (e.g., podcasts, music albums, and/or the like), and/or the like. A content element can display various information associated with the content element, such as a name associated with the content element, a description associated with the content element, media associated with the content element (e.g., a picture associated with the content element, a preview associated with the content element, and/or the like), and/or the like. For example, a content element associated with a television show can include the name of the television show, the time in which the television show is scheduled to air, a description of the particular episode of the television show, and/or a picture associated with the television show. The content elements can be the same size or different sizes based on different factors.

In some implementations, the grid-based programming guide can include a display of a plurality of content providers in a column (e.g., names of the plurality of content providers, logos of the plurality of content providers, and/or the like), and a display of a plurality of content elements, a channel number, a virtual channel number, and/or the like, associated with a particular content provider, in a row associated with the particular content provider. Additionally, or alternatively, the grid-based programming guide can include additional axis labels corresponding to either the plurality of content providers or plurality of the content elements. For example, various television networks can be displayed in a column, with television shows associated with a particular television network displayed in a row with the particular television network. An axis label can indicate various times throughout the day, and the television shows can be placed corresponding to particular times in which the television shows start. Additionally, or alternatively, display elements associated with the particular television shows can be elongated or shortened to correspond to the start time and end time of a particular television show.

The grid-based programming guide can include one or more grids, where each grid, of the one or more grids, is associated with a particular type of content provider. For example, the grid-based programming guide can include a first grid and a second grid, separate from the first grid. The first grid can be associated with a plurality of time-scheduled content providers, and a plurality of time-scheduled content elements, associated with the time-scheduled content elements. A time-scheduled content provider can provide time-scheduled content. Time-scheduled content can be content that is scheduled to be provided (e.g., broadcasted over-the-air, broadcasted over-the-top, and/or the like) at a particular time. Each time-scheduled content provider, of the plurality of time-scheduled content providers, can be associated with a row or column in the first grid. Each time-scheduled content provider can be associated with a channel (e.g., a frequency channel correlating to a radio frequency in which a time-scheduled content provider broadcasts content), with a channel number (e.g., a number that, when received by the client device, causes the client device to display time-scheduled content being broadcasted by the time-scheduled content provider), and/or the like. In some implementations, time-scheduled content providers can be ordered in the first grid based on different criteria, such as a channel number with which the time-scheduled content provider is associated, user selected options to display particular time-scheduled content providers in a particular order, and/or the like.

Time-scheduled content elements can be associated with particular time-scheduled content from a time-scheduled content provider. Time-scheduled content elements in a row or column associated with a particular time-scheduled content provider can be ordered based on various criteria (e.g., based on a programming schedule associated with the content provider). For example, time-scheduled content elements can be ordered from left to right based on a programming schedule set by the time-scheduled content provider under specific times with which each time-scheduled content element is associated, and/or the like.

The second grid, separate from the first grid, can include a plurality of on-demand content providers, of the plurality of content providers, and a plurality of on-demand content elements, of the plurality of content elements, associated with the plurality of on-demand content providers. An on-demand content provider can provide content that can be available at any time, rather than a scheduled time. An on-demand content element can include media such as audio, video, pictures, and/or the like. An on-demand content provider can be associated with a virtual channel number. The virtual number can be different from a channel number in that the virtual channel number can be disassociated with a frequency channel associated with a content provider, but allow the user to associate a channel number with a particular on-demand content provider. For example, a virtual channel number associated with an on-demand content provider, when received by the client device as input to the client device, can cause the client device to generate an instruction to display a home page associated with the on-demand content provider, display another type of web page associated with the on-demand content provider, and/or the like.

On-demand content providers can be organized, in the second grid, in a particular row or column with additional elements (e.g., a virtual channel number associated with the on-demand content provider, a name associated with an on-demand content provider, a logo associated with an on-demand content provider, one or more on-demand content elements associated with the on-demand content provider, and/or the like). On-demand content providers can be ordered in the second grid based on various criteria (e.g., criteria that can be the same and/or different than the criteria used to order the first grid), such as based on a virtual channel number with which the on-demand content provider is associated, based on alphabetical order of the name with which the on-demand content provider is associated, based on user-selected preferences of which content providers to display and in what order, and/or the like.

On-demand content elements in a row or column associated with a particular on-demand content provider can be ordered based on various criteria such as similarity of the on-demand content elements to another on-demand content element viewed by the user, one or more preferences associated with the user, new on-demand content being added to the content platform, on-demand content to be removed from the content platform, on-demand content most recently viewed by the user, ratings associated with the on-demand content, specially featured content by the content provider, popularity of the content element based on data from a nationwide audience, alphabetical order corresponding to the title of the content element, a rating assigned to the first plurality of on-demand content elements, a rating classification of the on-demand content elements, a date that the first plurality of on-demand content elements was previously aired, and/or the like.

In some implementations, the first grid can be displayed adjacent to the second grid (e.g., above, below, to the left, to the right, and/or the like). In some implementations, rows of the first grid can be interspersed with rows of the second grid. In some implementations, the location of the first grid (or rows of the first grid) and the second grid (or rows of the second grid) can be user configurable. For example, the client device can allow the user to configure, based on one or more factors, how rows of the first grid are displayed in connection with rows of the second grid. Example factors can include categories of content (e.g., movies, sports, content of particular ratings, and/or the like), times of a day and/or days of a week, information identifying a user accessing the client device, and/or the like. In some implementations, the client device can dynamically configure the placement of the first grid relative to the second grid based on one or more factors. For example, the client device can change the arrangement of the grids by placing the first grid above the second grid based on the user more commonly accessing content elements from the first grid. In some implementations, the client device can configure the content providers displayed in the first grid and/or the second grid. For example, the client device can automatically configure the time-scheduled content providers and/or the on-demand content providers respectively displayed in the first grid and/or the second grid based on a subscription of the user (e.g., based on which time-scheduled and/or on-demand content providers are included in a subscription associated with the user). As another example, the client device can receive input from a user that indicates the content providers that are to be displayed in the first grid and/or the second grid. As a further example, the client device can automatically configure the content providers that are to be displayed in the first grid and/or the second grid based on user viewing history (e.g., content providers that are viewed most frequently can be displayed first or highest in a grid, and/or the like).

In some implementations, the first grid can be independently scrollable from the second grid, or the first grid can be scrollable together with the second grid. For example, the second grid can start scrolling until the end of the first grid has been reached. In another example, the first grid and second grid can scroll independently depending on which one is selected. In some implementations, the client device can allow the user to configure how the first grid scrolls relative to how the second grid scroll.

In some implementations, instead of displaying the plurality of time-scheduled content providers, the plurality of time-scheduled content elements, the plurality of on-demand content providers, and the plurality of on-demand content elements in adjacent grids in the grid-based programming guide, the client device can interleave, intermingle, and/or mix the time-scheduled content and the on-demand content. In this case, the time-scheduled content and the on-demand content can be randomly interleaved, interleaved at a particular interval (e.g., every other row in the grid-based programming guide can include time-scheduled content), interleaved based on content type (e.g., time-scheduled sports content can be interleaved with on-demand sports content, time-scheduled childrens content can be interleaved with on-demand childrens content, and/or the like), and/or the like.

Figure 1B:
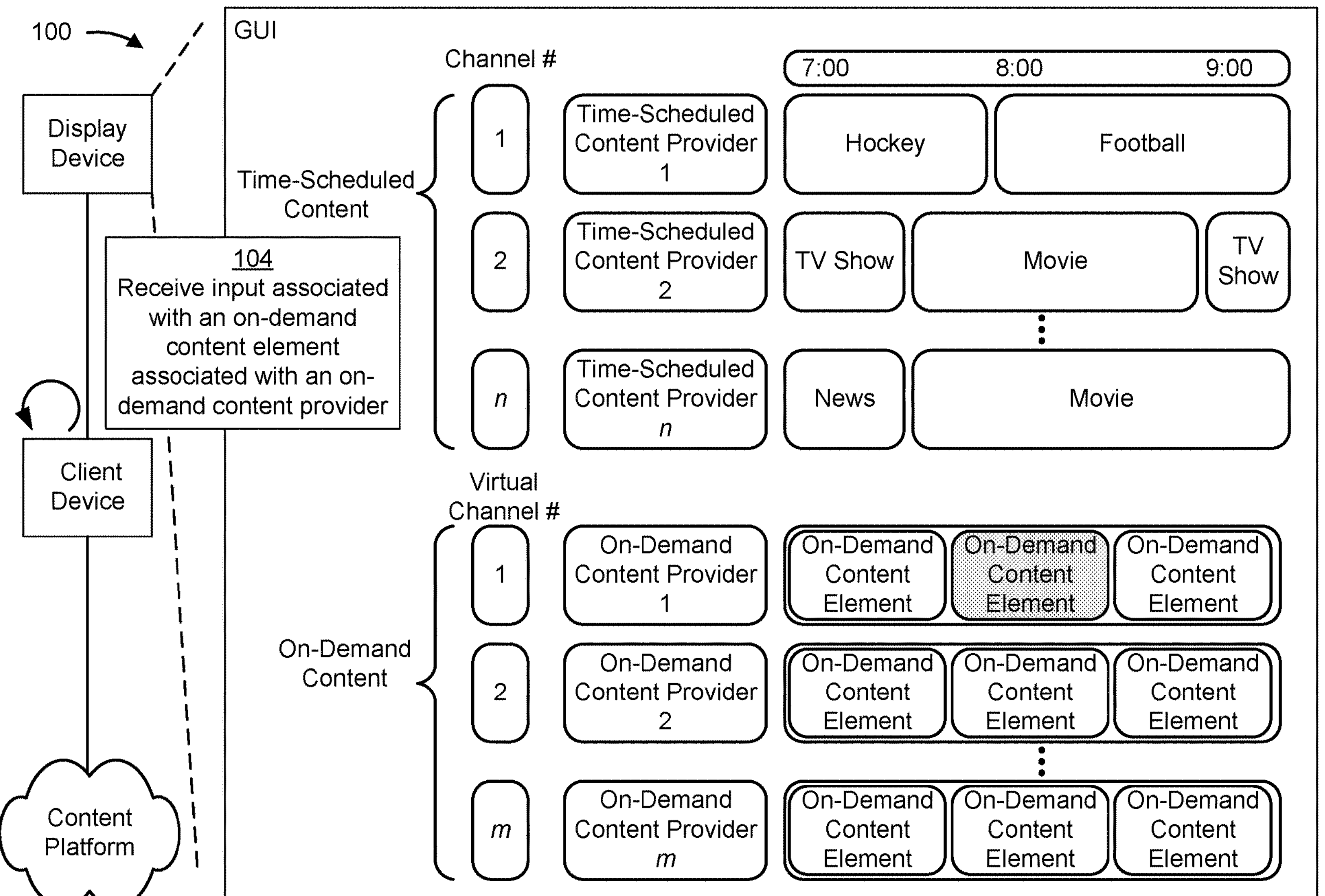

Turning to FIG. 1B, and as shown by reference number 104, the client device can receive an input associated with an on-demand content element associated with an on-demand content provider. The client device can receive the input via an input device (e.g., a remote, a keyboard, a mouse, a microphone, external service (i.e. Amazon Alexa, Google Home, and/or the like) and/or the like) to select the on-demand content element associated with an on-demand content provider. Additionally, or alternatively, the client device can receive the input via the display device (e.g., a user selecting content directly on the display device by tapping directly on a touch screen, and/or the like). For example, a user can select a television show associated with a particular on-demand content provider by tapping the on-demand content element, displayed on the display device, associated with the television show. In some implementations, the selection can be visually represented on the display device (e.g., by highlighting the selected on-demand content element, and/or the like), can be sonically represented by the client device, the display device, and/or another device (e.g., a tone can be played to indicate the selection of the on-demand content element, a voice confirmation from a virtual assistant can be played, and/or the like), and/or the like.

Figure 1C:
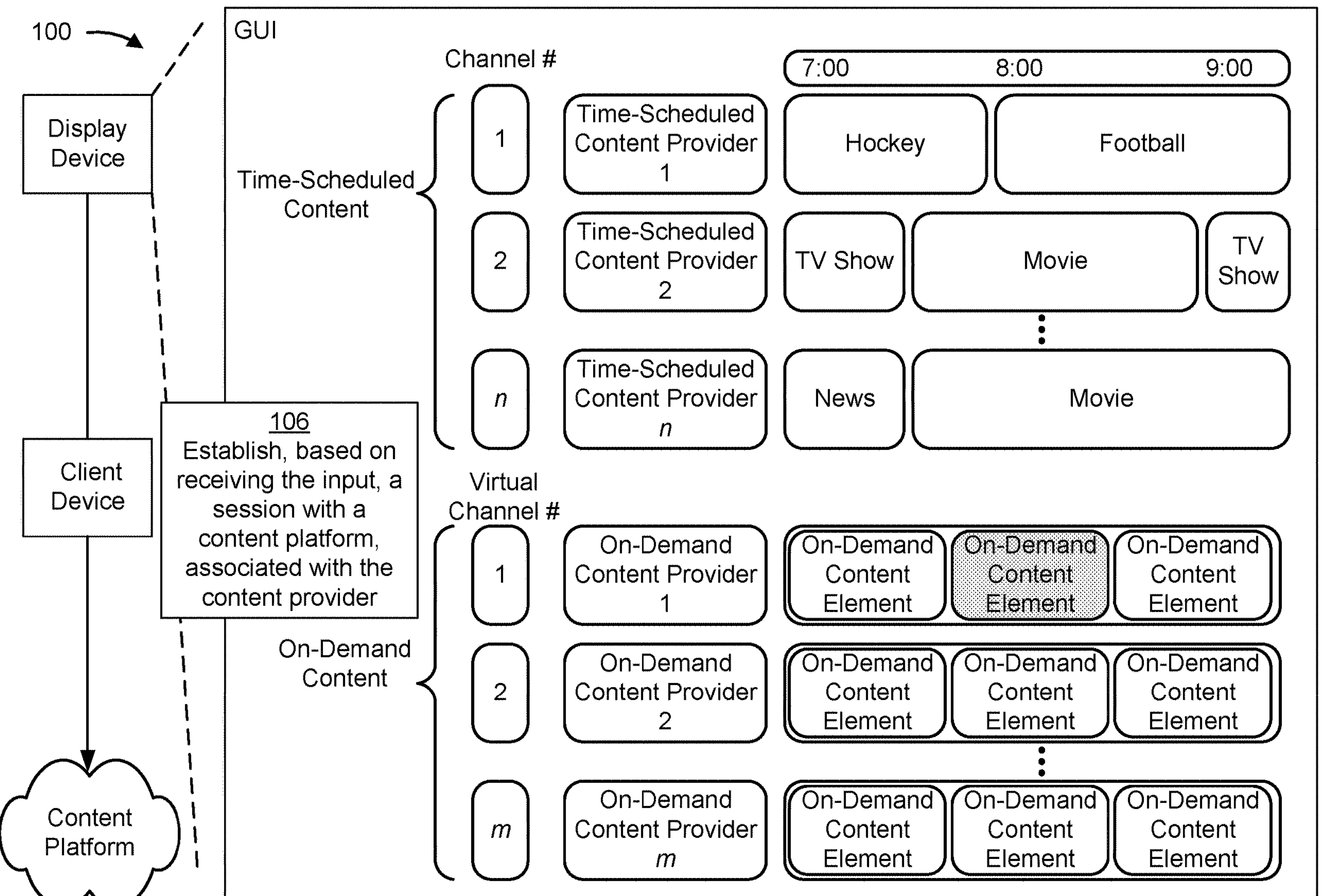

Turning to FIG. 1C, and as shown by reference number 106, the client device can establish, based on receiving the input, a session with the content platform associated with the content provider. The content platform can serve as a media portal for the content provider. In some implementations, the client device can establish the session with the content platform based on information associated with the selected on-demand content element. For example, the client device can store information, associated with the on-demand content element, that associates the on-demand content element with the content platform. As an example, the on-demand content element can be associated with information identifying an address of the content platform, such as an Internet protocol (IP) address, a port identifier (e.g., a port name, a port number, and/or the like), a uniform resource identifier (URI) associated with the content platform, and/or the like.

In some implementations, the client device can initiate the session by transmitting a request to the content platform to establish the session (e.g., a TCP handshake request). In some implementations, the session can be encrypted (e.g., using secure sockets layer (SSL) encryption, using transport layer security (TLS) encryption, using datagram TLS (DTLS) encryption, and/or the like). To encrypt the session, the client device and/or the content platform can exchange credentials (e.g., a token, a certificate, a key, and/or the like) such that the client device can verify the identity of the content platform based on the credential provided by the content platform, such that the content platform can verify the identity of the client device based on the credential provided by the client device, and/or such that the content platform can verify the identity of a user (e.g., based on credentials associated with the user). The credentials can be stored (e.g., in a data structure on the device, in a data structure on the content platform, in another location, and/or the like), the device can prompt the user to enter in credentials, and/or the like.

Figure 1D:
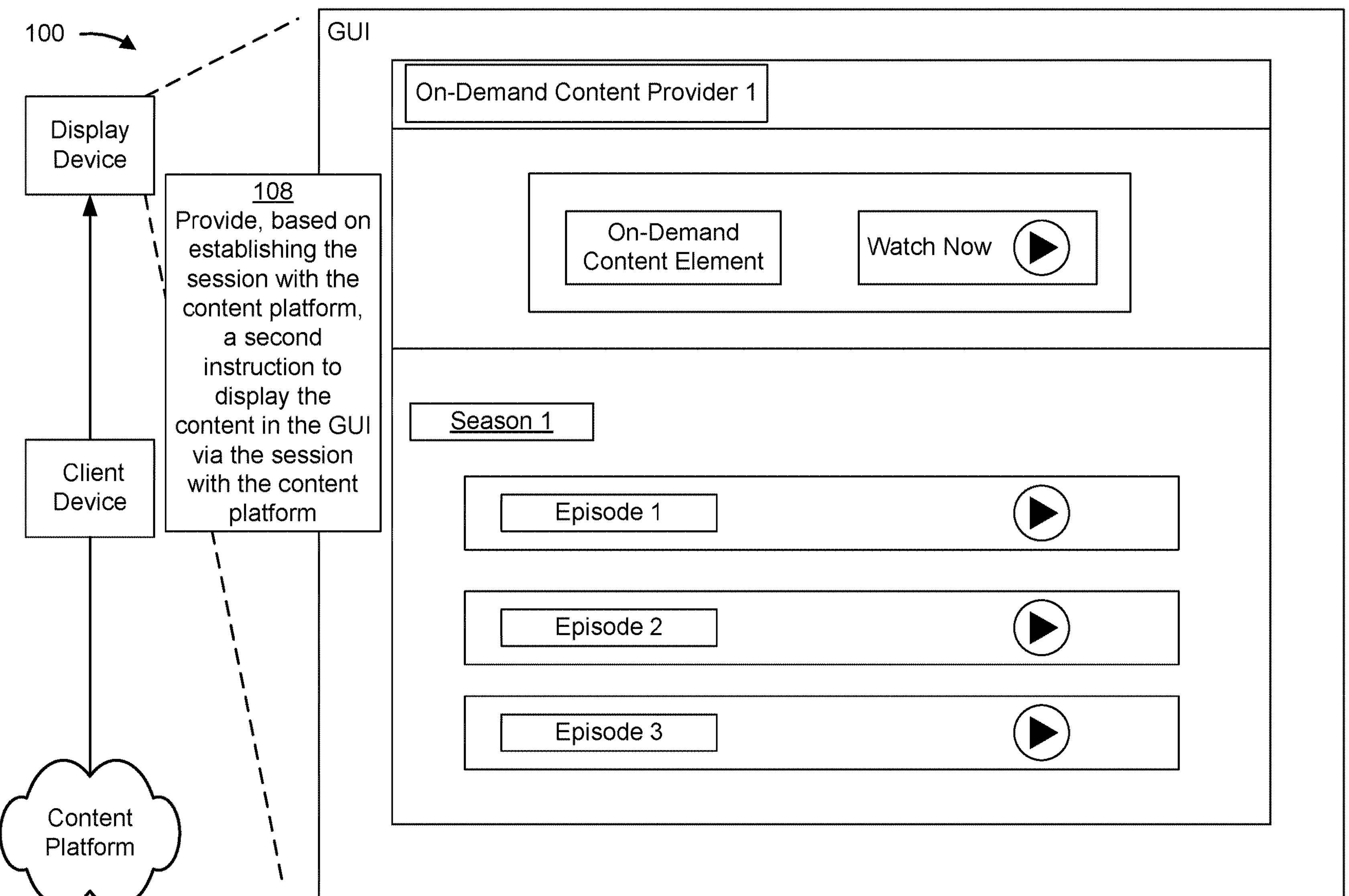

Turning to FIG. 1D, and as shown by reference number 108, the client device can provide, based on establishing the session with the content platform, a second instruction to the display device to display the content in the GUI via the session with the content platform. For example, the client device can display a web page associated with content element via the session, a streaming video associated with the content element via the session, and/or the like. The content can display additional information associated with the content element via the session (e.g., summary, title, episode information, and/or the like). In some implementations, the client device can play the streaming media from a place previously left off. For example, the client device can play a television show episode starting not from the beginning, but from a time in which the user had previously stopped the television show episode. The client device can provide the instruction immediately or include another prompt before providing the instruction.

In some implementations, instead of (and/or in addition to) providing an instruction to the display device to display the content via the session with the content platform, the client device can obtain, using the session with the content platform, content associated with the on-demand content element, and can provide an instruction to the display device to display the obtained content. For example, the client device can obtain a web page associated with the on-demand content element, a video and/or audio file associated with the on-demand content element, a video and/or audio stream associated with the on-demand content element, and/or the like. In some implementations, the client device can obtain the content by transmitting a hypertext transfer protocol (HTTP) request (e.g., a HTTP GET request, and/or the like) for a resource identifier (e.g., a uniform resource locator (URL), a web address, and/or the like) associated with the on-demand content element, and the content platform can respond to the HTTP request by providing the content to the client device. For example, the client device can store information associating a content element displayed in the GUI with a resource identifier of a web page associated with the on-demand content element, and/or the like. In some implementations, the client device can obtain the content by downloading the content to the client device, by streamlining the content from the content platform, and/or the like. In some implementations, to obtain and/or display the content, the client device can launch, on the client device, a third-party application, associated with the third-party content provider of the content to establish a secure connection and to conduct a session using a third-party GUI (e.g., if a user is using the content provider's service).

Figure 1E:
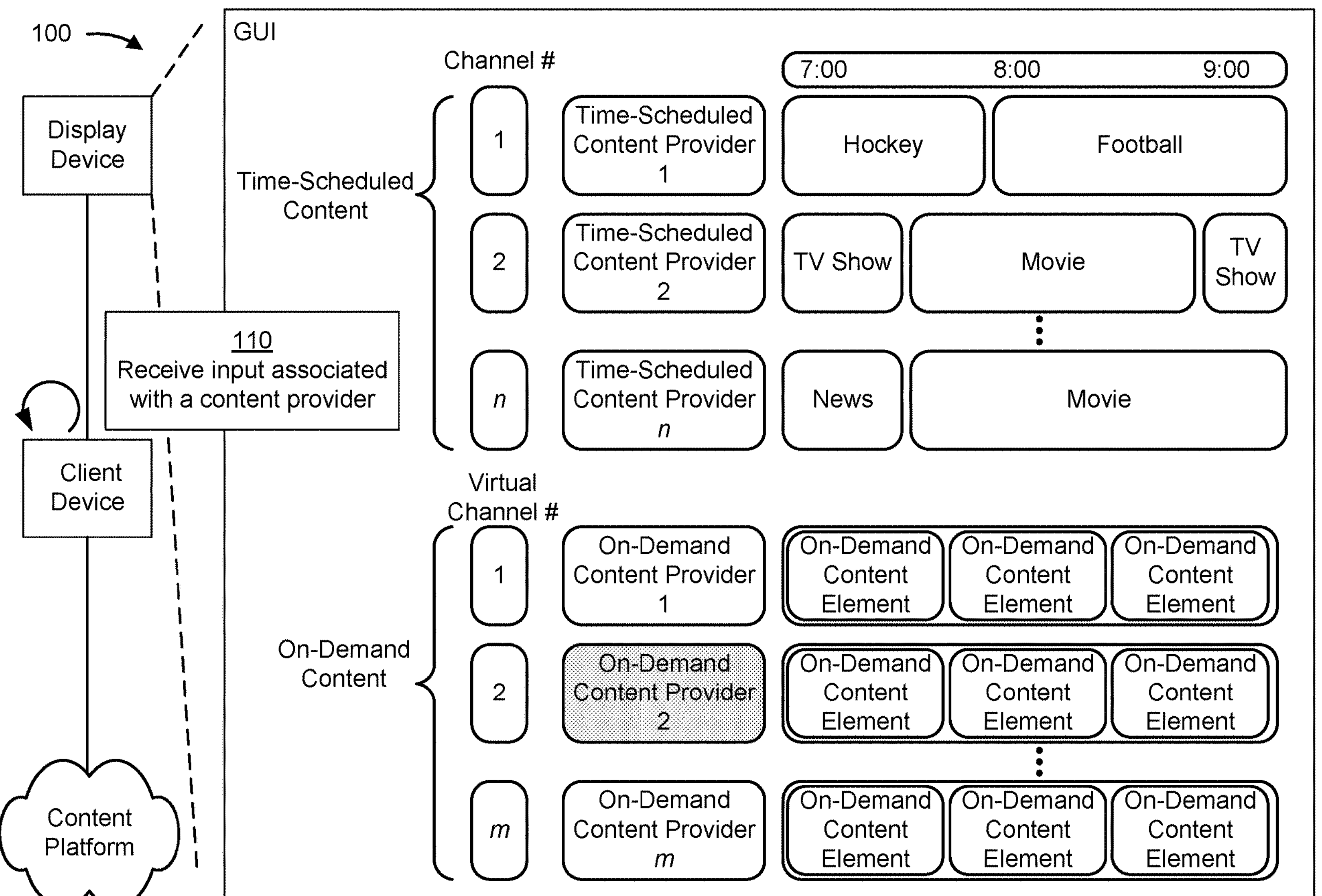

Turning to FIG. 1E, and as shown by reference number 110, the client device can receive input associated with an on-demand content provider. The input can be associated with the on-demand content provider rather than a particular content element associated with the on-demand content provider. The client device can receive the input via an input device (e.g., a remote, a keyboard, a mouse, a microphone, and/or the like) to select the on-demand content provider. Additionally, or alternatively, the client device can receive the input via the display device (e.g., a user selecting content directly on the display device by tapping directly on a touch screen, and/or the like). For example, a user can select an icon or logo associated with the on-demand content provider by tapping directly on the icon or logo associated with the on-demand content provider. In some implementations, the selection can be visually represented on the display device (e.g., by highlighting the selected on-demand content element, and/or the like), can be sonically represented by the client device, the display device, and/or another device (e.g., a tone can be played to indicate the selection of the on-demand content element, a voice confirmation from a virtual assistant can be played, and/or the like) and/or the like.

Figure 1F:
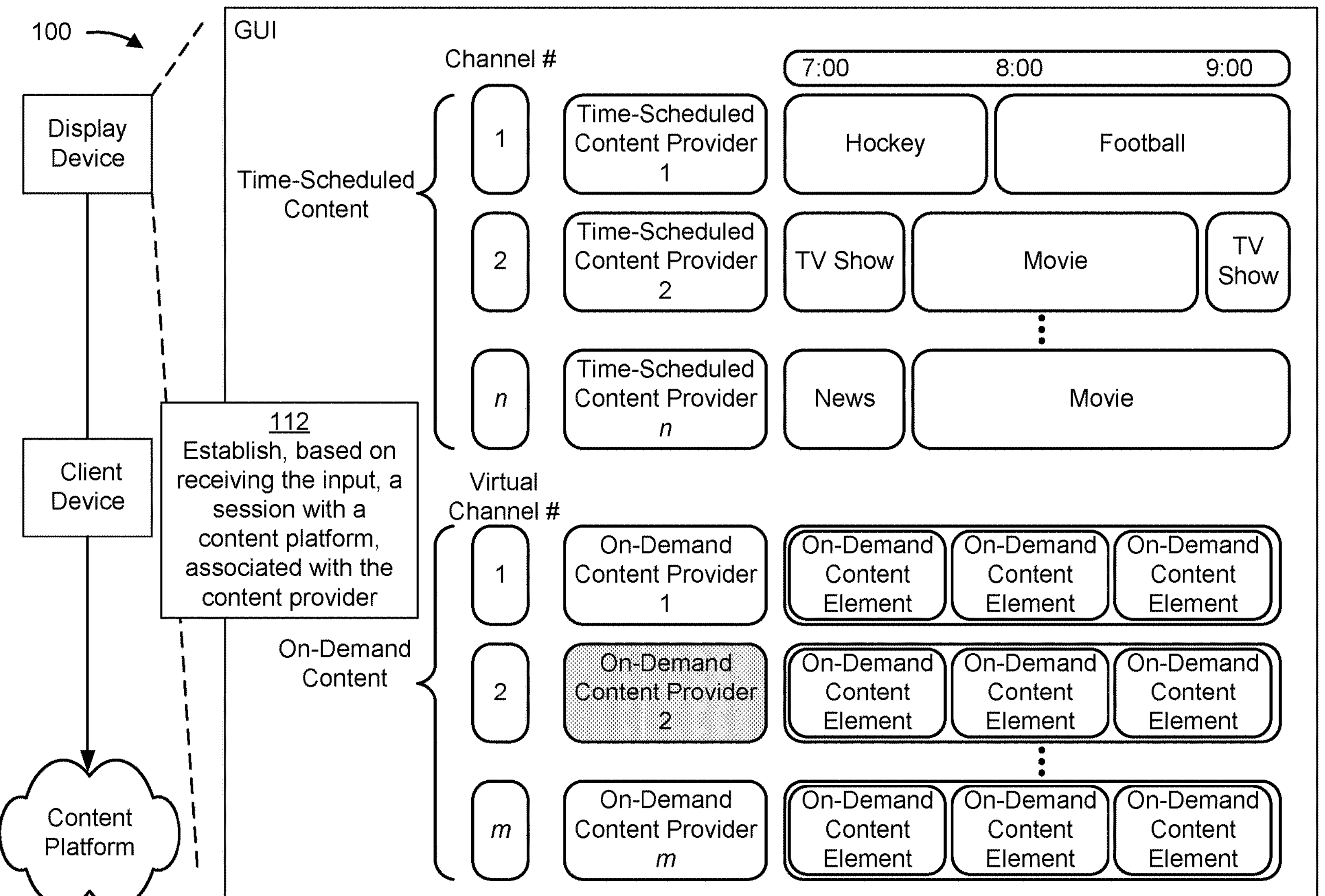

Turning to FIG. 1F, and as shown by reference number 112, the client device can establish, based on receiving the input, a session with the content platform associated with the on-demand content provider. The content platform can serve as a media portal for the content provider. In some implementations, the client device can establish the session with the content platform based on information associated with the selected on-demand content provider. For example, the client device can store information, associated with the on-demand content provider, that associates the on-demand content provider with the content platform. As an example, the on-demand content provider can be associated with information identifying an address of the content platform, such as an Internet protocol (IP) address, a port identifier (e.g., a port name, a port number, and/or the like), and/or the like.

In some implementations, the client device can initiate the session by transmitting a request to the content platform to establish the session (e.g., a TCP handshake request). In some implementations, the session can be encrypted (e.g., using SSL encryption, using TLS encryption, using DTLS encryption, and/or the like). To encrypt the session, the client device and/or the content platform can exchange credentials (e.g., a token, a certificate, a key, and/or the like) such that the client device can verify the identity of the content platform based on the credential provided by the content platform, such that the content platform can verify the identity of the client device based on the credential provided by the client device, and/or such that the content platform can verify the identity of a user (e.g., based on credentials associated with the user). The credentials can be stored (e.g., in a data structure on the device, in a data structure on the content platform, in another location, and/or the like), the device can prompt the user to enter in credentials, and/or the like.

Figure 1G:
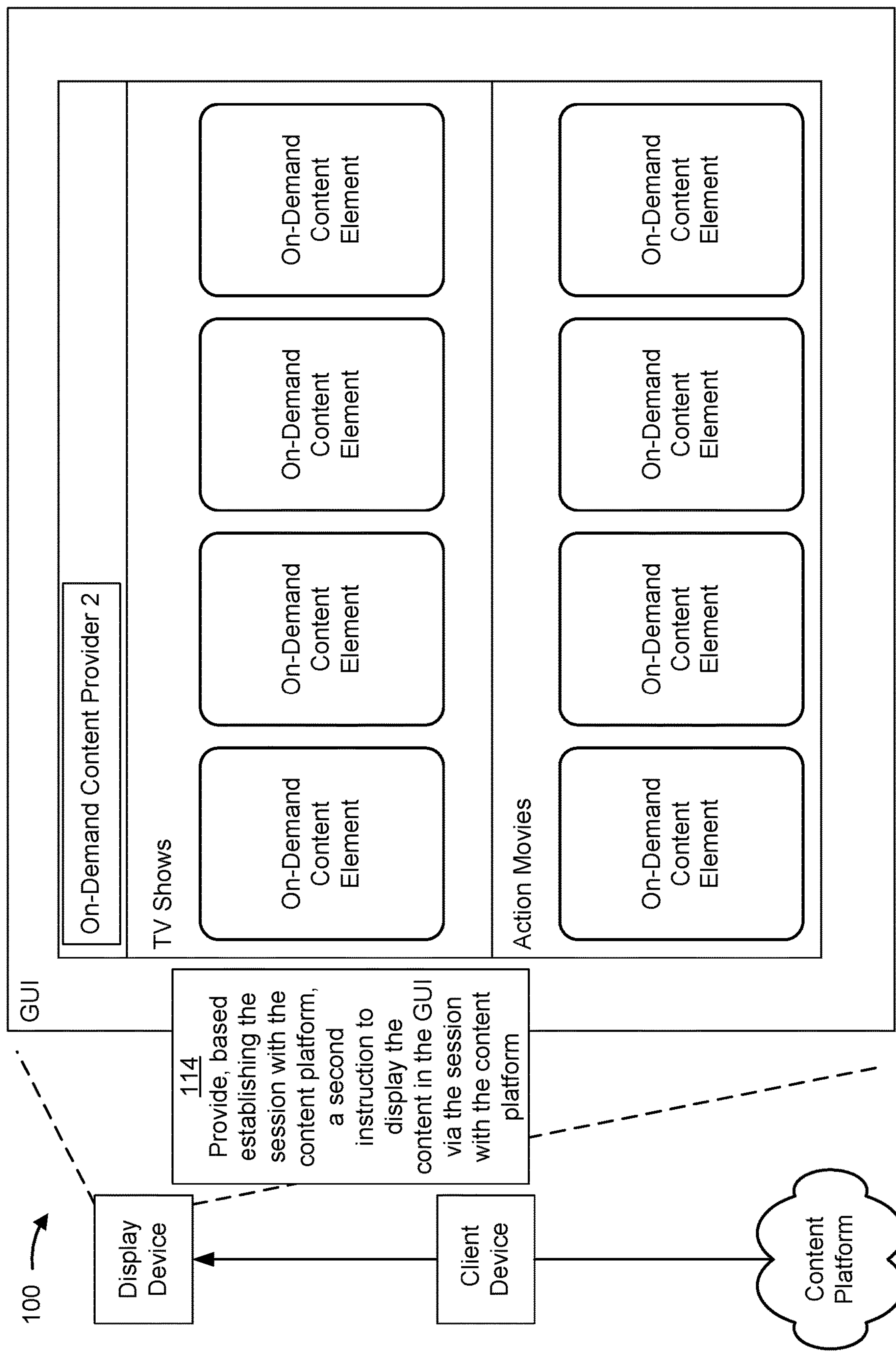

Turning to FIG. 1G, and as shown by reference number 114, the client device can provide, based on establishing the session with the content platform, a second instruction to the display device to display the content in the GUI via the session with the content platform. For example, the client device can display a home page associated with the on-demand content provider via the session. Additionally, or alternatively, the home page can include information about various on-demand content elements associated with the on-demand content provider. In some implementations, the content can display additional information associated with the content elements (e.g., summary, title, episode information and/or the like) of each of the content elements via the session. For example, the client device can display a home page including recently watched television shows or most popular television shows associated with on-demand content provider via the session. The client device can provide the instruction immediately or include another prompt before providing the instruction.

In some implementations, instead of (and/or in addition to) providing an instruction to display the content via the session with the content platform, the client device can obtain, using the session with the content platform, content associated with the on-demand content provider, and can provide an instruction to the display device display the obtained content. For example, the client device can obtain a home page and/or another type of web page associated with the on-demand content provider, a video and/or audio file associated with the on-demand content provider, a video and/or audio stream associated with the on-demand content provider, and/or the like. For example, the client device can transmit a HTTP request (e.g., HTTP GET request) for a resource identifier (e.g., a URL, a web address, and/or the like) associated with the content element, and the content platform can respond to the HTTP request by providing the content to the client device. For example, the client device can store information associating the logo and/or name of the on-demand content provider, displayed in the GUI, with a resource identifier of a home page associated with the on-demand content provider, as well as information identifying an address of the content platform from which to obtain the home page (e.g., IP address, port identifier, and/or the like).

Figure 1H:
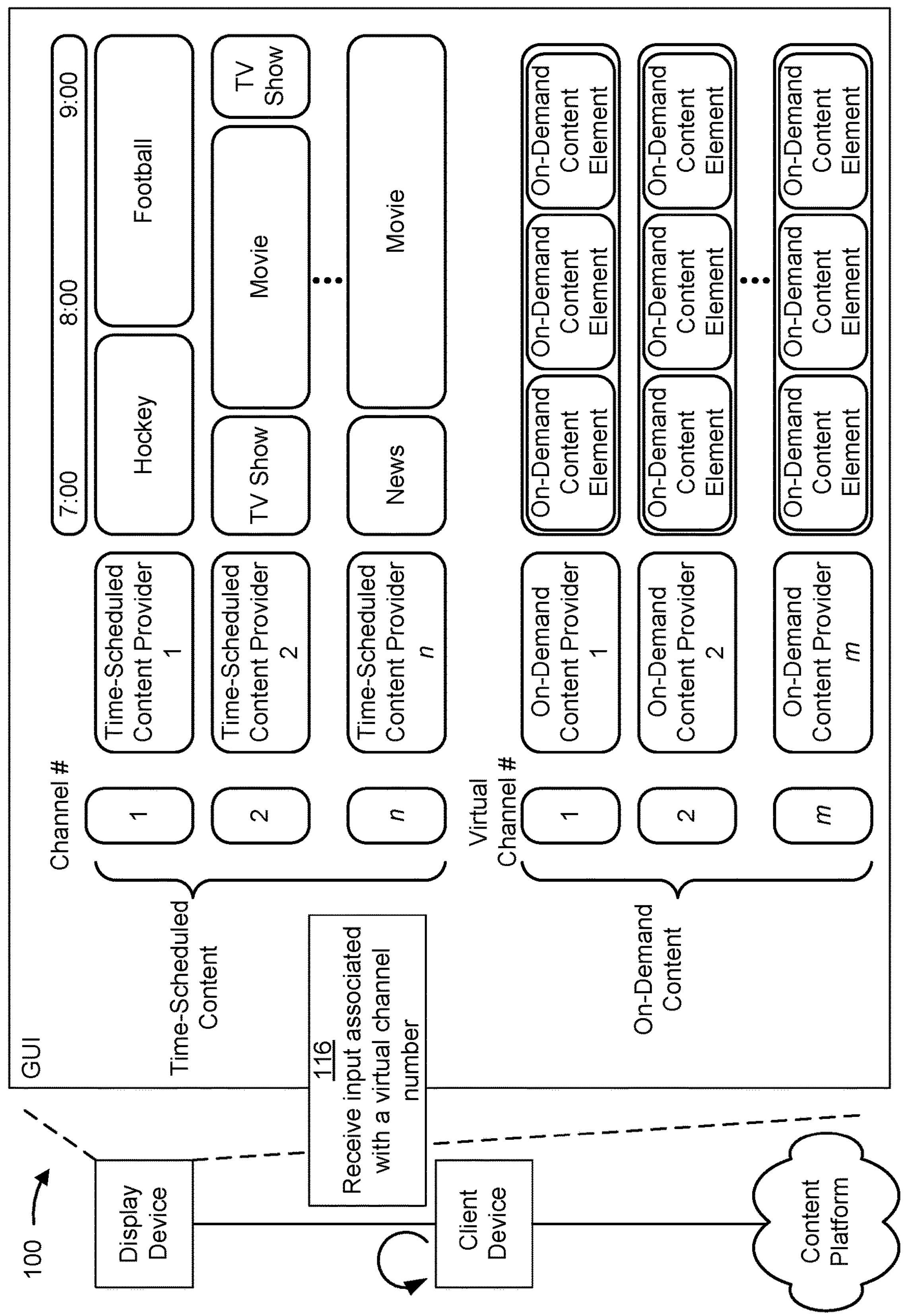

Turning to FIG. 1H, and as shown by reference number 116, the client device can receive input associated with virtual channel number. The client device can receive input via an input device (e.g., a remote, a keyboard, a mouse, a microphone, and/or the like). For example, a user can enter in a virtual channel number associated with an on-demand content provider into a remote. Additionally, or alternatively, the client device can receive the input via the display device (e.g., a user tapping on a touch screen, and/or the like). For example, a user can directly tap an element displaying the virtual channel number associated with a particular on-demand content provider on the display device, enter the virtual channel number using a virtual keyboard displayed on the display device, and/or the like. In some implementations, the selection can be visually represented on the display device (e.g., by highlighting the selected virtual channel number, and/or the like), can be sonically represented by the client device, the display device, and/or another device (e.g., a tone can be played to indicate the selection of the virtual channel number, a voice confirmation from a virtual assistant can be played, and/or the like), and/or the like.

Figure 1I:
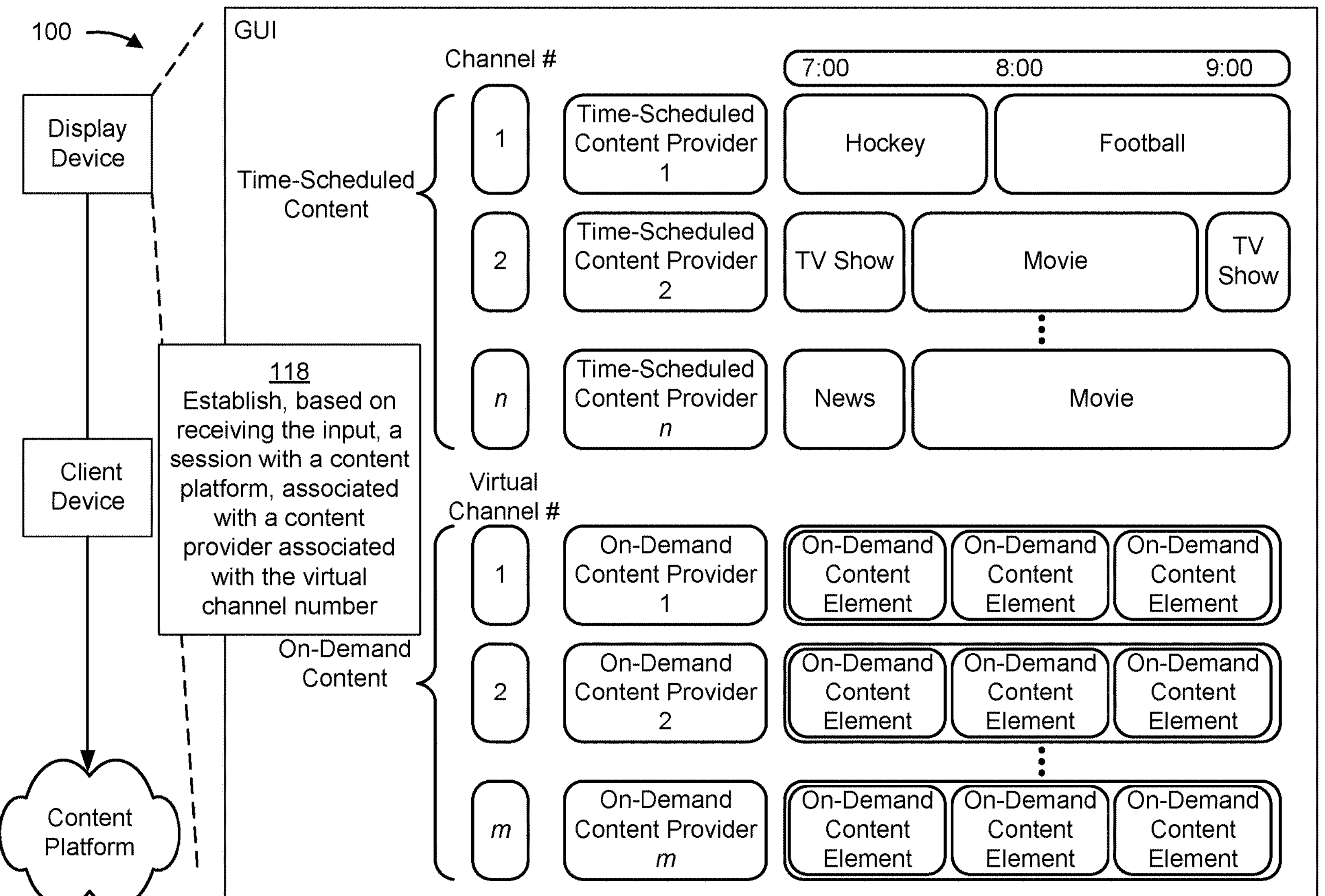

Turning to FIG. 1I, and as shown by reference number 118, the client device can establish, based on receiving the input, a session with the content platform associated with the on-demand content provider associated with the virtual channel number. The content platform can serve as a media portal for the content provider. In some implementations, the client device can establish the session with the content platform based on information associated with the selected virtual channel number. For example, the client device can store information, associated with the virtual channel number, that associates the virtual channel number with the content platform. As an example, the virtual channel number can be associated with information identifying an address of the content platform, such as an Internet protocol (IP) address, a port identifier (e.g., a port name, a port number, and/or the like), and/or the like.

In some implementations, the client device can initiate the session by transmitting a request to the content platform to establish a session (e.g., a TCP handshake request). In some implementations, the session can be encrypted (e.g., using SSL encryption, using TLS encryption, using DTLS encryption, and/or the like). To encrypt the session, the client device and/or the content platform can exchange credentials (e.g., a token, a certificate, a key, and/or the like) such that the client device can verify the identity of the content platform based on the credential provided by the content platform, such that the content platform can verify the identity of the client device based on the credential provided by the client device, and/or such that the content platform can verify the identity of a user (e.g., based on credentials associated with the user). The credentials can be stored (e.g., in a data structure on the device, in a data structure on the content platform, in another location, and/or the like), the device can prompt the user to enter in credentials, and/or the like.

Figure 1J:
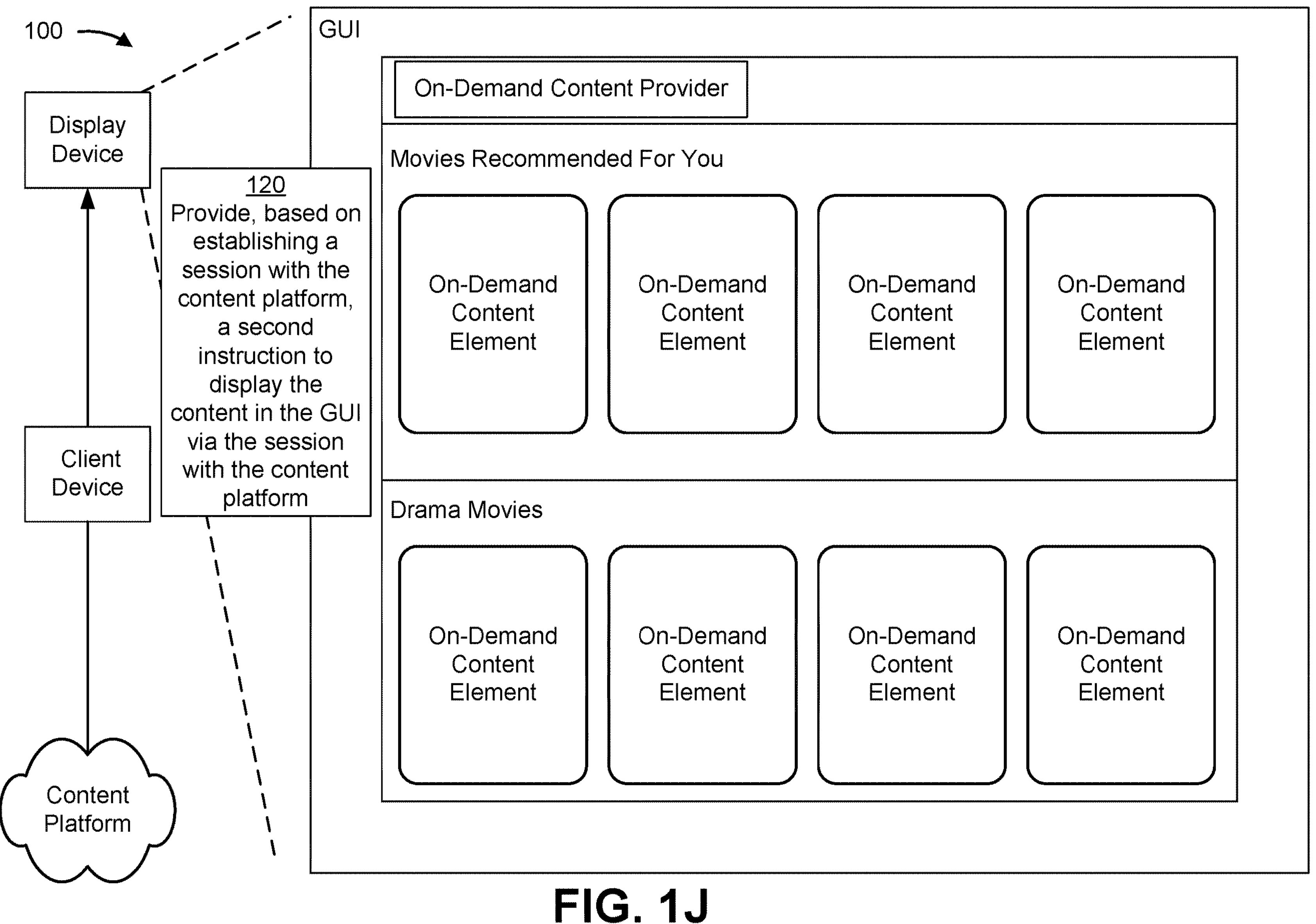

Turning to FIG. 1J, and as shown by reference number 120, the client device can provide, based on establishing the session with the content platform, a second instruction to the display device to display the content in the GUI via the session with the content platform. For example, the client device can display a home page associated with the on-demand content provider via the session. Additionally, or alternatively, the home page can include information about various on-demand content elements associated with the on-demand content provider. In some implementations, the content can display additional information associated with the content elements (e.g., summary, title, episode information and/or the like) of each of the content elements via the session. For example, the client device can display a home page including recently watched television shows or most popular television shows associated with on-demand content provider via the session. The client device can provide the instruction immediately or include another prompt before providing the instruction.

In some implementations, instead of (and/or in addition to) the client device providing the instruction to the display device to display the content via the session, the client device can obtain, using the session with the content platform, content associated with the on-demand content provider, and can provide an instruction to the display device to display the obtained content. For example, the client device can obtain a home page and/or another web page associated with the on-demand content element, a video and/or audio file associated with the on-demand content element, a video and/or audio stream associated with the on-demand content element, and/or the like.

In some implementations, the client device can obtain the content by transmitting a HTTP request (e.g., a HTTP GET request, and/or the like) for a resource identifier (e.g., a URL, a web address, and/or the like) associated with the on-demand content provider, and the content platform can respond to the HTTP request by providing the content to the client device. For example, the client device can store information associating the virtual channel number, displayed in the GUI, with the resource identifier of a home page associated with the on-demand content provider, and can use the stored information to obtain the content.

In this way, the client device can generate a display of a grid-based programming guide, in which a grid of time-based content elements is displayed along with a grid of on-demand content elements from a plurality of different content providers in the same GUI. In this way, a user can view and/or access content elements from both time-scheduled and on-demand content providers in the same programming guide in on GUI. This conserves computing resources, memory resources, battery consumption, and/or the like, that would otherwise be used to display and/or switch between displaying different programming guides. Moreover, this improves the user experience of the GUI by reducing the quantity of interactions with the GUI that are needed to locate a particular content element.

As indicated above, FIGS. 1A-1J are provided merely as an example. Other examples are possible and can differ from what was described with regard to FIGS. 1A-1J. The number and arrangement of devices and networks shown in FIGS. 1A-1J are provided as an example. In practice, there can be additional devices, fewer devices, different devices, or differently arranged devices than those shown in FIGS. 1A-1J. Furthermore, two or more devices shown in FIGS. 1A-1J can be implemented within a single device, or a single device shown in FIGS. 1A-1J can be implemented as multiple, distributed devices. Additionally, or alternatively, a set of devices (e.g., one or more devices) of implementation 100 can perform one or more functions described as being performed by another set of devices of implementation 100.

Figure 2:
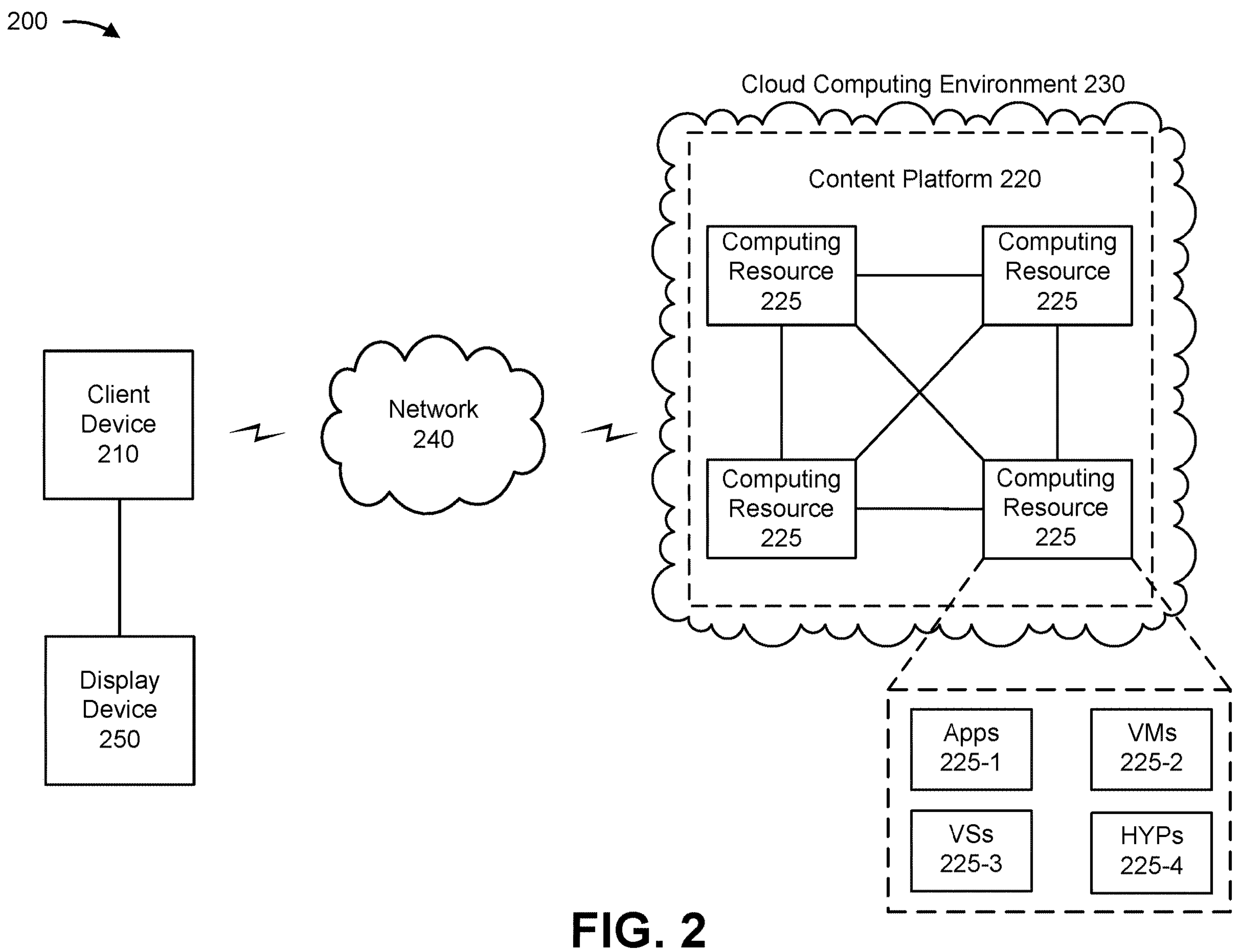
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a content platform 220, a computing resource 225, a cloud computing environment 230, a network 240, and a display device 250. Devices of environment 200 can interconnect via wired connections, wireless connections, or a combination of wired and wireless connections.

Client device 210 includes one or more devices capable of receiving, generating, storing, processing, and/or providing information associated with displaying time-based content and on-demand content in a grid-based programming guide. For example, client device 210 can include a communication and/or computing device, such as a set-top box, a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, client device 210 can provide an instruction to generate a GUI, provide the instruction to display device 250, receive an input associated with a first on-demand content provider, establish, based on receiving the input, a session with content platform 220, associated with the first on-demand content provider, and provide, based on establishing the session with content platform 220, a second instruction to display the content in the GUI via the session with the content platform to display device 250, and/or the like.

Content platform 220 includes one or more computing resources capable of receiving, generating, storing, processing, and/or providing data associated with displaying time-based content and on-demand content in a grid-based programming guide. For example, content platform 220 can be a platform implemented by cloud computing environment 230. In some implementations, content platform 220 is implemented by computing resources 225 of cloud computing environment 230. In some implementations, content platform 220 can store and/or provide access to various types of content, such as on-demand content associated with an on-demand content provider (e.g., on-demand movies, on-demand television shows, and/or the like), web-based content associated with the content provider (e.g., a web page associated with a particular on-demand content element, a home page associated with the on-demand content provider, and/or the like), and/or the like.

Cloud computing environment 230 includes an environment that hosts content platform 220. Cloud computing environment 230 can provide computation, software, data access, storage, and/or other services that do not require end-user knowledge of a physical location and configuration of a system and/or a device that delivers the services. As shown, cloud computing environment 230 can include content platform 220 and computing resource 225.

Computing resource 225 includes one or more personal computers, workstation computers, server devices, or another type of computation and/or communication device. In some implementations, computing resource 225 can host content platform 220. The cloud resources can include compute instances executing in computing resource 225, storage devices provided in computing resource 225, data transfer devices provided by computing resource 225, and/or the like. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by client device 210. Application 225-1 can eliminate a need to install and execute the software applications on client device 210. For example, application 225-1 can include software associated with content platform 220 and/or any other software capable of being provided via cloud computing environment 230. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., a user of client device 210), and can manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Display device 250 includes a device capable of displaying the GUI generated by client device 210. In some implementations, display device 250 can include a touch screen display, a monitor, a television, and/or the like. For example, display device 250 can receive the GUI, including the grid-based programming guide generated by client device 210, along with an instruction to display the GUI, and display device 250 can display the GUI based on receiving the GUI and the instruction.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
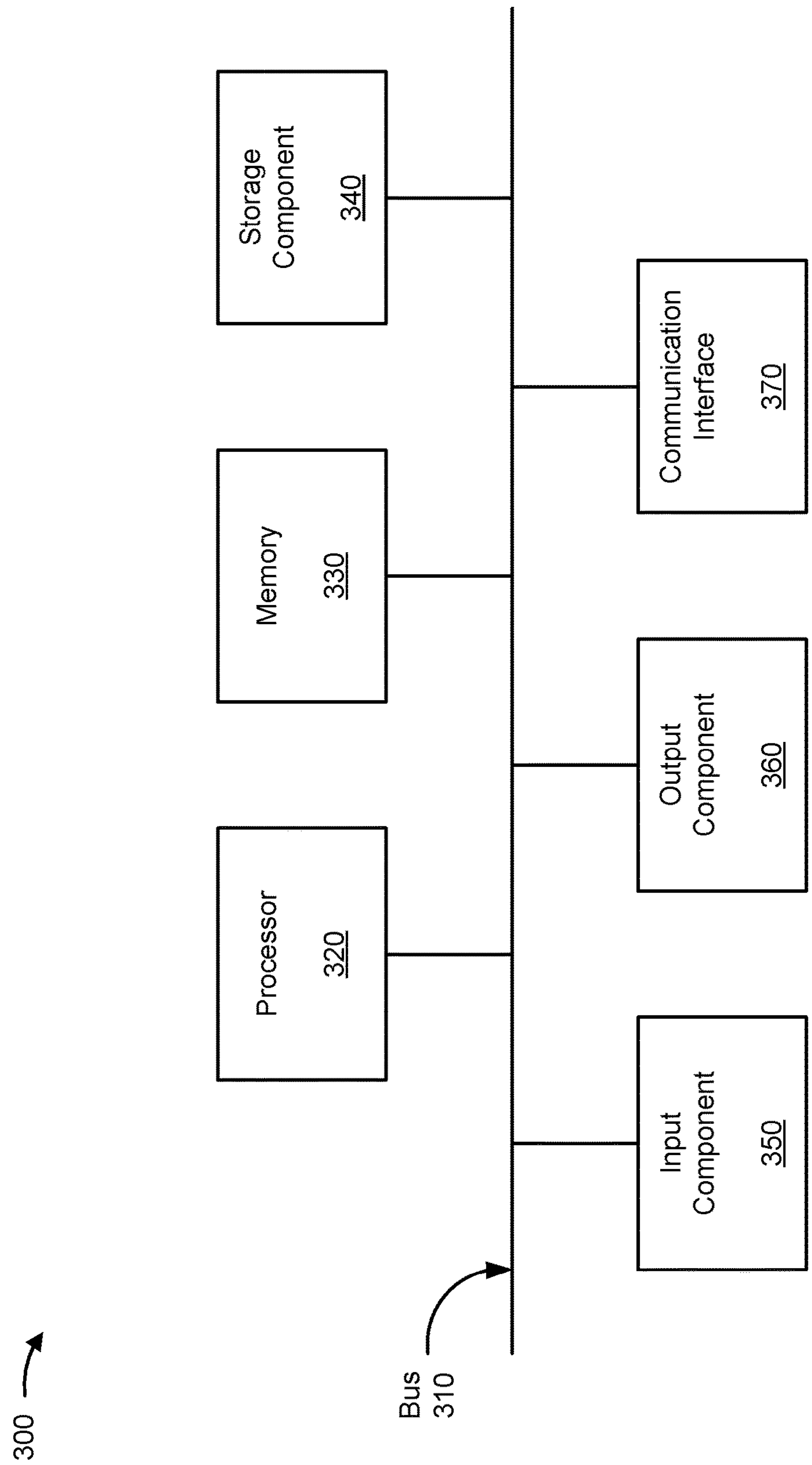
FIG. 3 is a diagram of example components of one or more devices of FIG. 2.

FIG. 3 is a diagram of example components of a device 300. Device 300 can correspond to client device 210, content platform 220, computing resource 225, and/or display device 250. In some implementations, client device 210, content platform 220, computing resource 225, and/or display device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
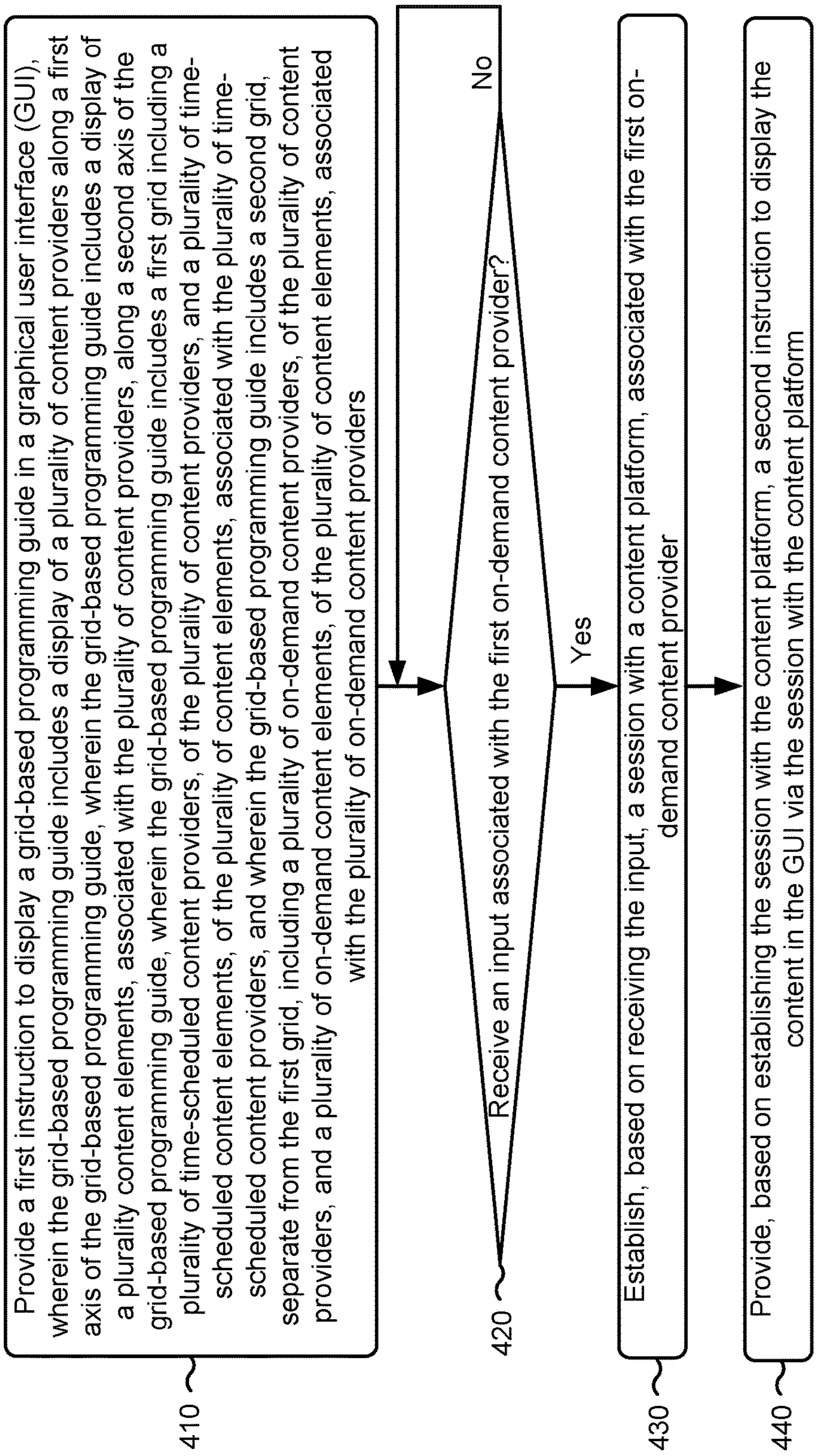
FIG. 4 is a flow chart of example process for displaying time-based content and on-demand content in a grid-based programming guide.

FIG. 4 is a flow chart of an example process 400 for displaying time-based content and on-demand content in a grid-based programming guide. In some implementations, one or more process blocks of FIG. 4 can be performed by a client device (e.g., client device 210). In some implementations, one or more process blocks of FIG. 4 can be performed by another device or a group of devices separate from or including the client device, such as a content platform (e.g., content platform 220), a display device (e.g., display device 250), and/or another device.

As shown in FIG. 4, process 400 can include providing a first instruction to display a grid-based programming guide in a GUI, wherein the grid-based programming guide includes a display of a plurality of content providers along a first axis of the grid-based programming guide, wherein the grid-based programming guide includes a display of a plurality of content elements, associated with the plurality of content providers, along a second axis of the grid-based programming guide, wherein the grid-based programming guide includes a first grid including a plurality of time-scheduled content providers, of the plurality of content providers, and a plurality of time-scheduled content elements, of the plurality of content elements, associated with the plurality of time-scheduled content providers, and wherein the grid-based programming guide includes a second grid, separate from the first grid, including a plurality of on-demand content providers, of the plurality of content providers, and a plurality of on-demand content elements, of the plurality of content elements, associated with the plurality of on-demand content providers (block 410). For example, the client device (e.g., using processor 320, memory 330, storage component 340, output component 360, and/or the like) can provide a first instruction to display a grid-based programming guide in a GUI, as described above in connection with FIGS. 1A-1J. In some implementations, the grid-based programming guide can include a display of a plurality of content providers along a first axis of the grid-based programming guide. In some implementations, the grid-based programming guide can include a display of a plurality of content elements, associated with the plurality of content providers, along a second axis of the grid-based programming guide. In some implementations, the grid-based programming guide can include a first grid including a plurality of time-scheduled content providers, of the plurality of content providers, and a plurality of time-scheduled content elements, of the plurality of content elements, associated with the plurality of time-scheduled content providers. In some implementations, the grid-based programming guide can include a second grid, separate from the first grid, including a plurality of on-demand content providers, of the plurality of content providers, and a plurality of on-demand content elements, of the plurality of content elements, associated with the plurality of on-demand content providers.

As further shown in FIG. 4, process 400 can include receiving an input associated with a first on-demand content provider (block 420). For example, the client device (e.g., using processor 320, memory 330, storage component 340, input component 350, communication interface 370, and/or the like) can receive an input associated with a first on-demand content provider, as described above in connection with FIGS. 1A-1J. In some implementations, if the client device does not receive the input, process 400 can return to block 420 so that the client device can listen for, or determine whether the input is received.

As further shown in FIG. 4, process 400 can include establishing a session with a content platform, associated with the first on-demand content provider (block 430). For example, the client device (e.g., client device 210 using processor 320, memory 330, storage component 340, output component 360, and/or the like) can establish a session with a content platform, associated with the first on-demand content provider, as described above in connection with FIGS. 1A-1J.

As further shown in FIG. 4, process 400 can include providing, based on establishing the session with the content platform, a second instruction to display the content in the GUI via the session with the content platform (block 440). For example, the client device (e.g., using processor 320, memory 330, storage component 340, output component 360, and/or the like) can provide, based on establishing the session with the content platform, a second instruction to display the content in the GUI via the session with the content platform, as described above in connection with FIGS. 1A-1J. In some implementations, instead of establishing the session with the content platform, the client device can obtain and/or display the content, the client device can launch, on the client device, a third-party application, associated with the third-party content provider of the content to establish a secure connection and to conduct a session using a third-party GUI (e.g., if a user is using the content provider's service).

Process 400 can include additional implementations, such as any single implementation or any combination of implementations described below and/or in connection with one or more other processes described elsewhere herein.

In some implementations, the input can be associated with a selection of an on-demand content element, of a first plurality of on-demand content elements included in the plurality of on-demand content elements, associated with the first on-demand content provider, wherein the content is associated with the on-demand content element, and the wherein the content can include a web page associated with the on-demand content element.

In some implementations, the input can be associated with a selection of the first on-demand content provider, and the content associated with the first on-demand content provider can include a home page associated with the first on-demand content provider. In some implementations, a first plurality of on-demand content elements, of the plurality of on-demand content elements, associated with the first on-demand content provider can be ordered based on at least one of a viewing history, associated with a user, of the first plurality of on-demand content elements, a similarity of the first plurality of on-demand content elements to another on-demand content element viewed by the user, one or more preferences associated with the user, a rating assigned to the first plurality of on-demand content elements, a rating classification of the on-demand content elements, or a date that the first plurality of on-demand content elements was previously aired.

In some implementations, the time-scheduled content providers and the plurality of time-scheduled content elements may be interleaved with the plurality of time-scheduled content providers and the plurality of time-scheduled content elements, or the plurality of time-scheduled content providers and the plurality of time-scheduled content elements are included in a first grid of the grid-based programming guide, and the plurality of time-scheduled content providers and the plurality of time-scheduled content elements are included in a second grid of the grid-based programming guide, wherein the first grid is independently scrollable relative to the second grid, or wherein the first grid is scrollable together with the second grid.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5B:
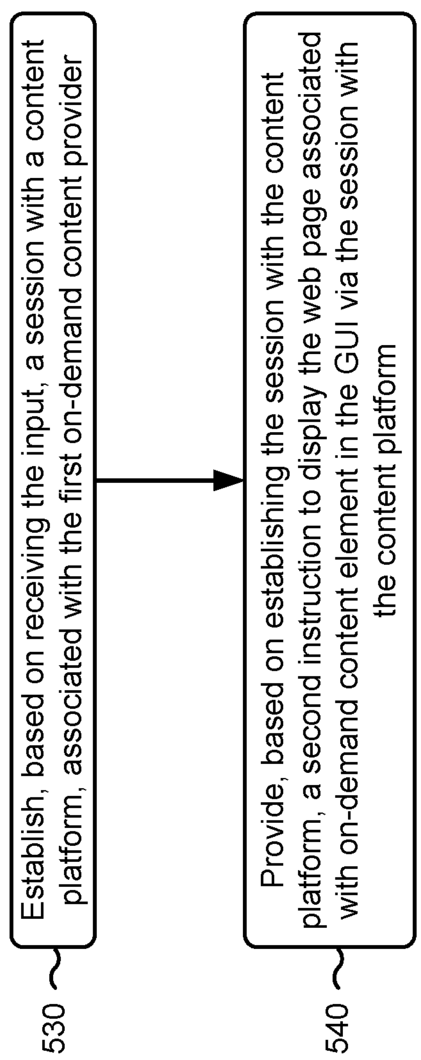
Figure 5C:
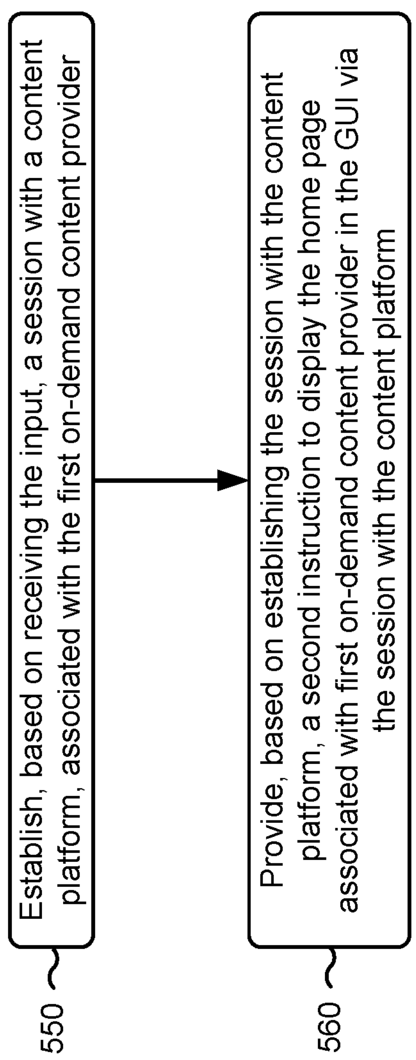

FIGS. 5A-5C are flow charts of an example process 500 for displaying time-based content and on-demand content in a grid-based programming guide. In some implementations, one or more process blocks of FIGS. 5A-5C can be performed by a client device (e.g., client device 210). In some implementations, one or more process blocks of FIGS. 5A-5C can be performed by another device or a group of devices separate from or including the client device, such as a content platform (e.g., content platform 220), a display device (e.g., display device 250), and/or another device.

As shown in FIG. 5A, process 500 can include providing a first instruction to display a grid-based programming guide in a graphical user interface (GUI), wherein the grid-based programming guide includes a display of a plurality of content providers along a first axis of the grid-based programming guide, wherein the grid-based programming guide includes a display of a plurality of content elements, associated with the plurality of content providers, along a second axis of the grid-based programming guide, wherein the grid-based programming guide includes a plurality of time-scheduled content providers, of the plurality of content providers, and a plurality of time-scheduled content elements, of the plurality of content elements, associated with the plurality of time-scheduled content providers, and wherein the grid-based programming guide includes a plurality of on-demand content providers, of the plurality of content providers, and a plurality of on-demand content elements, of the plurality of content elements, associated with the plurality of on-demand content providers (block 510). For example, the client device (e.g., using processor 320, memory 330, storage component 340, output component 360, and/or the like) can provide a first instruction to display a grid-based programming guide in a GUI, as described above in connection with FIGS. 1A-1J. In some implementations, the grid-based programming guide can include a display of a plurality of content providers along a first axis of the grid-based programming guide. In some implementations, the grid-based programming guide can include a display of a plurality of content elements, associated with the plurality of content providers, along a second axis of the grid-based programming guide. In some implementations, the grid-based programming guide can include a plurality of time-scheduled content providers, of the plurality of content providers, and a plurality of time-scheduled content elements, of the plurality of content elements, associated with the plurality of time-scheduled content providers. In some implementations, the grid-based programming guide can include a plurality of on-demand content providers, of the plurality of content providers, and a plurality of on-demand content elements, of the plurality of content elements, associated with the plurality of on-demand content providers.

As further shown in FIG. 5A, process 500 can include receiving an input associated with a first on-demand content provider (block 520). For example, the client device (e.g., using processor 320, memory 330, storage component 340, input component 350, communication interface 370, and/or the like) can receive an input associated with a first on-demand content provider, as described above in connection with FIGS. 1A-1J.

As shown in FIG. 5B, where the input is associated with a selection of an on-demand content element associated with the first on-demand content provider, process 500 can include establishing a session with a content platform, associated with the first on-demand content provider (block 530). For example, the client device (e.g., using processor 320, memory 330, storage component 340, output component 360, and/or the like) can establish a session with a content platform, associated with the first on-demand content provider, as described above in connection with FIGS. 1A-1J.

As further shown in FIG. 5B, process 500 can include providing, based on establishing the session with the content platform, a second instruction to display the web page associated with the on-demand content in the GUI via the session with the content platform (block 540). For example, the client device (e.g., using processor 320, memory 330, storage component 340, output component 360, and/or the like) can provide, based on establishing the session with the content platform, a second instruction to display the content in the GUI via the session with the content platform, as described above in connection with FIGS. 1A-1J.

As shown in FIG. 5C, where the input is associated with a selection of the first on-demand content provider and/or associated with a selection of a virtual channel number associated with the first on-demand content provider, process 500 can include establishing a session, based on receiving the input, a session with a content platform associated with the first on-demand content provider (block 550). For example, the client device (e.g., client device 210, memory 330, storage component 340, output component 360, and/or the like) can establish a session with a content platform, associated with the first on-demand content provider, as described above in connection with FIGS. 1A-1J.

As further shown in FIG. 5C, process 500 can include providing, based on establishing the session with the content platform, a second instruction to display the home page associated with the first on-demand content provider in the GUI (block 560). For example, the client device (e.g., using processor 320, memory 330, storage component 340, output component 360, and/or the like) can provide, based on establishing the session with the content platform, a second instruction to display the home page associated with the first on-demand content provider in the GUI, as described above in connection with FIGS. 1A-1J.

Although FIGS. 5A-5C show example blocks of process 500, in some implementations, process 500 can include additional blocks, fewer blocks, different blocks, or differently arranged blocks than those depicted in FIGS. 5A-5C. Additionally, or alternatively, two or more of the blocks of process 500 can be performed in parallel.

In this way, the client device can provide instruction to display a grid-based programming guide, in which a grid of time-based content elements is displayed along with a grid of on-demand content elements from a plurality of different content providers in the same GUI. This conserves computing resources, memory resources, and/or battery resources of the client device that would otherwise be used to display and/or switch between displaying different programming guides. Further, this improves user experience by reducing the quantity of interactions with the GUI that are needed to locate a particular content element.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, and/or the like). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, and/or the like), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

providing, by a device, a first instruction to display a grid-based programming guide in a graphical user interface (GUI), wherein the grid-based programming guide includes a display of a plurality of content providers along a first axis of the grid-based programming guide, wherein the grid-based programming guide includes a display of a plurality of content elements, associated with the plurality of content providers, along a second axis of the grid-based programming guide, wherein the grid-based programming guide includes a first grid comprising a plurality of time-scheduled content providers, of the plurality of content providers, and a plurality of time-scheduled content elements, of the plurality of content elements, associated with the plurality of time-scheduled content providers, and wherein the grid-based programming guide includes a second grid comprising a plurality of on-demand content providers, of the plurality of content providers, and a plurality of on-demand content elements, of the plurality of content elements, associated with the plurality of on-demand content providers, the second grid being configured to begin scrolling until an end of the first grid is reached, a scrolling of the first grid being configurable by a user to be relative to how the second grid scrolls, and wherein the first grid is displayed simultaneously with the second grid in the GUI;

receiving, by the device, an input associated with a first on-demand content provider;

establishing, by the device and based on receiving the input, a session with a content platform, associated with the first on-demand content provider; and providing, by the device and based on establishing the session with the content platform, a second instruction to display the content in the GUI via the session with the content platform.

2. The method of claim 1, wherein the input is associated with a selection of an on-demand content element, of a first plurality of on-demand content elements included in the plurality of on-demand content elements, associated with the first on-demand content provider;

wherein the content is associated with the on-demand content element; and wherein the content comprises:

a web page associated with the on-demand content element.

3. The method of claim 1, wherein the input is associated with a selection of the first on-demand content provider; and wherein the content associated with the first on-demand content provider comprises:

a home web page associated with the first on-demand content provider.

4. The method of claim 1, wherein a first plurality of on-demand content elements, of the plurality of on-demand content elements, associated with the first on-demand content provider is ordered based on at least one of:

a viewing history, associated with the user, of the first plurality of on-demand content elements, a similarity of the first plurality of on-demand content elements to another on-demand content element viewed by the user, one or more preferences associated with the user, a rating assigned to the first plurality of on-demand content elements, a rating classification of the on-demand content elements, or a date that the first plurality of on-demand content elements was previously aired.

5. The method of claim 1, wherein the first on-demand content provider is associated with a virtual channel number;

wherein the input is associated with the virtual channel number; and wherein the content associated with the first on-demand content provider comprises:

a home page associated with the first on-demand content provider.

6. The method of claim 1, wherein establishing the session with the content platform based on receiving the input comprises:

authenticating the session between the device and the content platform based on credentials associated with at least one of:

the user, the content platform, or the device.

7. The method of claim 1, wherein the time-scheduled content providers and the plurality of time-scheduled content elements are interleaved with the plurality of time-scheduled content providers and the plurality of time-scheduled content elements.

8. A device, comprising:

one or more memories; and one or more processors, communicatively coupled to the one or more memories, to:

provide a first instruction to display a grid-based programming guide in a graphical user interface (GUI), wherein the grid-based programming guide includes a display of a plurality of content providers along a first axis of the grid-based programming guide, wherein the grid-based programming guide includes a display of a plurality of content elements, associated with the plurality of content providers, along a second axis of the grid-based programming guide, wherein the grid-based programming guide includes a first grid comprising a plurality of time-scheduled content providers, of the plurality of content providers, and plurality of time-scheduled content elements, of the plurality of content elements, associated with the plurality of time-scheduled content providers, and wherein the grid-based programming guide includes a second grid comprising a plurality of on-demand content providers, of the plurality of content providers, and a plurality of on-demand content elements, of the plurality of content elements, associated with the plurality of on-demand content providers, the second grid being configured to begin scrolling until an end of the first grid is reached, a scrolling of the first grid being configurable by a user to be relative to how the second grid scrolls, and wherein the first grid is displayed simultaneously with the second grid in the GUI;

receive an input associated with a first on-demand content provider;

establish, based on receiving the input, a session with a content platform, associated with the first on-demand content provider; and provide, based on establishing the session with the content platform, a second instruction to display the content in the GUI via the session with the content platform.

9. The device of claim 8, wherein the input is associated with a selection of an on-demand content element, of a first plurality of on-demand content elements, included in the plurality of on-demand content elements, associated with the first on-demand content provider;

wherein the content is associated with the on-demand content element; and wherein the content comprises:

a web page associated with the on-demand content element.

10. The device of claim 8, wherein the input is associated with a selection of the first on-demand content provider; and wherein the content associated with the first on-demand content provider comprises:

a home web page associated with the first on-demand content provider.

11. The device of claim 8, wherein a first plurality of on-demand content elements, of the plurality of on-demand content elements, associated with the first on-demand content provider is ordered based on at least one of:

a viewing history, associated with the user, of the first plurality of on-demand content elements, a similarity of the first plurality of on-demand content elements to another on-demand content element viewed by the user, one or more preferences associated with the user, a rating assigned to the first plurality of on-demand content elements, a rating classification of the on-demand content elements, or a date that the first plurality of on-demand content elements was previously aired.

12. The device of claim 8, wherein the first on-demand content provider is associated with a virtual channel number;

wherein the input is associated with the virtual channel number; and wherein the content associated with the first on-demand content provider comprises:

a home page associated with the first on-demand content provider.

13. The device of claim 8, wherein the one or more processors, when establishing the session with the content platform based on receiving the input, are to:

authenticate the session between the device and the content platform based on credentials associated with at least one of:

the user, the content platform, or the device.

14. The device of claim 8, wherein the time-scheduled content providers and the plurality of time-scheduled content elements are interleaved with the plurality of time-scheduled content providers and the plurality of time-scheduled content elements.

15. A non-transitory computer-readable medium storing instructions, the instructions comprising:

one or more instructions that, when executed by one or more processors of a device, cause the one or more processors to:

provide a first instruction to display a grid-based programming guide in a graphical user interface (GUI), wherein the grid-based programming guide includes a display of a plurality of content providers along a first axis of the grid-based programming guide, wherein the grid-based programming guide includes a display of a plurality of content elements, associated with the plurality of content providers, along a second axis of the grid-based programming guide, wherein the grid-based programming guide includes a first grid comprising a plurality of time-scheduled content providers, of the plurality of content providers, and a plurality of time-scheduled content elements, of the plurality of content elements, associated with the plurality of time-scheduled content providers, and wherein the grid-based programming guide includes a second grid comprising a plurality of on-demand content providers, of the plurality of content providers, and a plurality of on-demand content elements, of the plurality of content elements, associated with the plurality of on-demand content providers, the second grid being configured to begin scrolling until an end of the first grid is reached, a scrolling of the first grid being configurable by a user to be relative to how the second grid scrolls, and wherein the first grid is displayed simultaneously with the second grid in the GUI;

receive an input associated with a first on-demand content provider;

establish, based on receiving the input, a session with a content platform, associated with the first on-demand content provider; and provide, based on establishing the session with the content platform, a second instruction to display the content in the GUI via the session with the content platform.

16. The non-transitory computer-readable medium of claim 15, wherein the input is associated with a selection of an on-demand content element, of a first plurality of on-demand content elements included in the plurality of on-demand content elements, associated with the first on-demand content provider;

wherein the content is associated with the on-demand content element; and wherein the content comprises:

a web page associated with the on-demand content element.

17. The non-transitory computer-readable medium of claim 15, wherein the input is associated with a selection of the first on-demand content provider; and wherein the content associated with the first on-demand content provider comprises:

a home page associated with the first on-demand content provider.

18. The non-transitory computer-readable medium of claim 15, wherein the first on-demand content provider is associated with a virtual channel number;

wherein the input is associated with the virtual channel number; and wherein the content associated with the first on-demand content provider comprises:

a home page associated with the first on-demand content provider.

19. The non-transitory computer-readable medium of claim 15, wherein the one or more instructions, that cause the one or more processors to establish the session with the content platform based on receiving the input, cause the one or more processors to:

authenticate the session between the device and the content platform based on credentials associated with at least one of:

the user, the content platform, or the device.

20. The non-transitory computer-readable medium of claim 15, wherein the time-scheduled content providers and the plurality of time-scheduled content elements are interleaved with the plurality of time-scheduled content providers and the plurality of time-scheduled content elements.

* * * * *